United States Patent [19]
Lembke et al.

[11] Patent Number: 5,723,784
[45] Date of Patent: Mar. 3, 1998

[54] FLOW RATE METER

[75] Inventors: Manfred Lembke, Gerlingen; Josef Kleinhans, Vaihingen; Hans Hecht, Korntal-Muenchingen; Helmut Bassler, Weinstadt; Gerhard Hueftle, Aspach; Alexander Kromer, Stuttgart; Kurt Weiblen, Metzingen; Stefan Lehenberger, Maierhoefen; Guenther Frick, Schwieberdingen; Klaus Reymann, Gerlingen; Axel-Werner Haag, Stuttgart; Dieter Tank, Eberdingen; Uwe Konzelmann, Asperg; Waldemar Guenther, Bietigheim-Bissingen; Henninge Marberg, Weil der Stadt, all of Germany

[73] Assignee: Robert Bosch GmbH, Stuttgart, Germany

[21] Appl. No.: 676,850

[22] Filed: Jul. 8, 1996

[30] Foreign Application Priority Data

Jul. 6, 1995 [DE] Germany ............... 195 24 634.9

[51] Int. Cl.⁶ ............................................. G01F 1/68
[52] U.S. Cl. ............................................. 73/204.26
[58] Field of Search ....................... 73/204.26, 204.22, 73/204.24

[56] References Cited

U.S. PATENT DOCUMENTS 4,756,190  7/1988  Ohta et al. .................. 73/204.26
4,888,988  12/1989  Lee et al. .................... 73/204.26
4,912,975  4/1990  Ohta et al. .................. 73/204.26
4,947,688  8/1990  Yagawara et al. ............ 73/204.26
5,311,775  5/1994  Suski et al. .................. 73/204.26
5,353,638  10/1994  Marek ......................... 73/204.26
5,404,753  4/1995  Hecht et al. ................. 73/204.22
5,406,841  4/1995  Kimura ....................... 73/204.26

FOREIGN PATENT DOCUMENTS 4219454  12/1993  Germany.

*Primary Examiner*—Elizabeth L. Dougherty
*Assistant Examiner*—Jewel Artis
*Attorney, Agent, or Firm*—Edwin E. Greigg; Ronald E. Greigg

[57] ABSTRACT

The invention proposes a device for measuring the mass of a flowing medium, in particular the mass of air aspirated by internal combustion engines. The device has a platelike sensor element which is accommodated in a recess of a sensor carrier, and which with a sensor region that has at least one measuring resistor is exposed to the flowing medium in order to measure its mass. The sensor element is accommodated essentially flush in the recess and is retained in the recess by being glued to a bottom face in the recess. The bottom face of the recess of the sensor carrier has a troughlike indentation, which extends at least partially along the circumference of the sensor element outside the sensor region that has the at least one measuring resistor. The device according to the invention is intended to measure the mass of a flowing medium, in particular for measuring the mass of air aspirated by internal combustion engines.

9 Claims, 2 Drawing Sheets

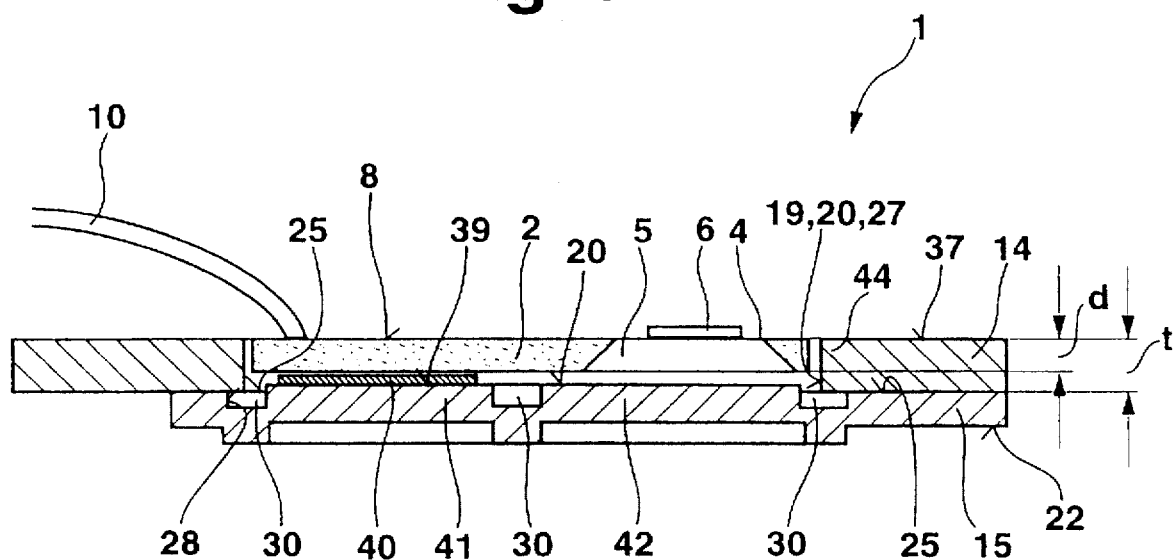
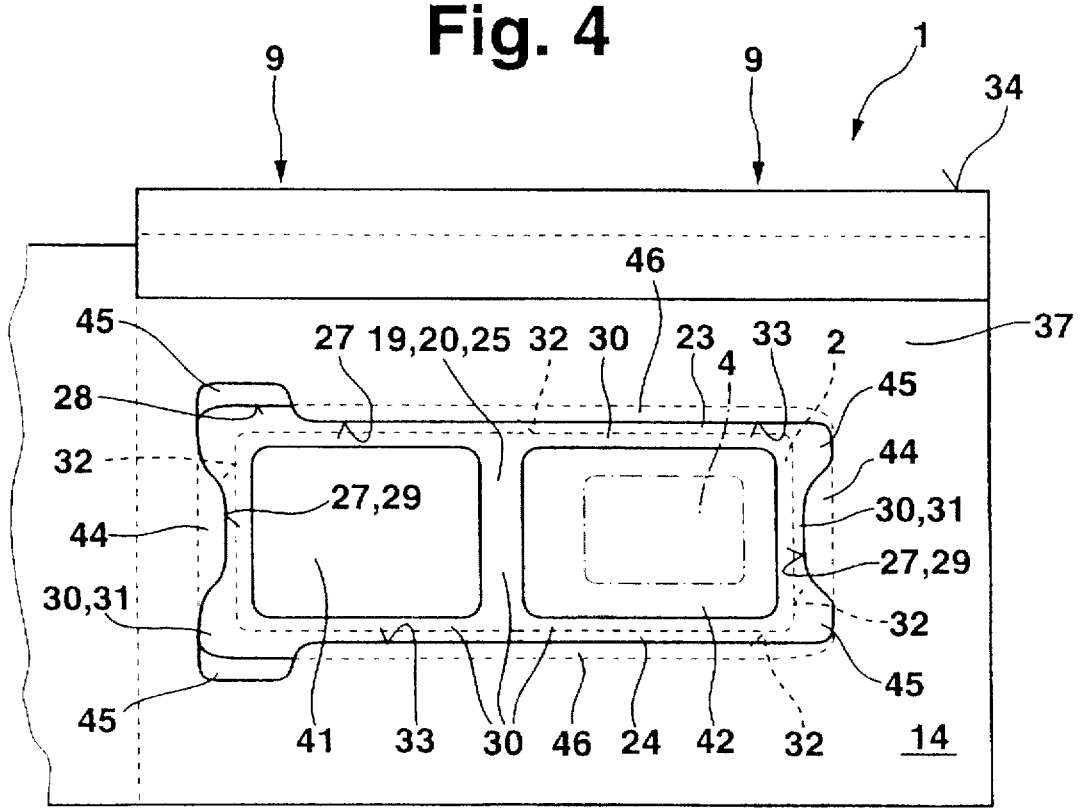

FLOW RATE METER

BACKGROUND OF THE INVENTION

The invention is based on a flow rate meter, or device for measuring the mass of a flowing medium for an internal combustion engine. A device is already known (German Offenlegungsschrift 42 19 454) which has a platelike sensor element with a dielectric diaphragm which by means of adhesive is glued flatly, or in other words with a large portion of its surface, into a recess of a sensor carrier. The flat gluing of the sensor element in the recess assures the prevention of a flow beneath the sensor element in the recess, and in particular beneath a void recessed out from the diaphragm of the sensor element and a bottom face of the recess; such a flow would otherwise disadvantageously affect the outcome of the measurement. When the gluing is done flatly, however, there is a high risk of breakage especially upon assembly and in the process of gluing the sensor element. To reduce this risk of breakage, a mode of fastening is known in which the sensor element is glued on only one side into the recess, so that it is accommodated in the recess with its diaphragm being self-supported. With this kind of self-supported mode of fastening the sensor element, however, an undesirable flow underneath the sensor element in the recess can occur, which disadvantageously affects the outcome of measurement by the device.

OBJECT AND SUMMARY OF THE INVENTION

The device according to the invention has the advantage that the risk of breakage of the sensor element is considerably reduced, and moreover a flow underneath the sensor element is reliably prevented, so that a precise measurement outcome is attainable.

Advantageous further features of and improvements to the device are possible by means of the provisions recited hereinafter.

The invention will be better understood and further objects and advantages thereof will become more apparent from the ensuing detailed description of preferred embodiments taken in conjunction with the drawings.

BRIEF DESCRIPTION OF THE DRAWINGS

FIG. 3 is a cross-sectional view of the sensor carrier with a sensor element in accordance with a second exemplary embodiment of the device according to the invention;

FIG. 4 is a plan view on the sensor carrier of FIG. 3.

DETAILED DESCRIPTION OF THE PREFERRED EMBODIMENTS

Figure 1:
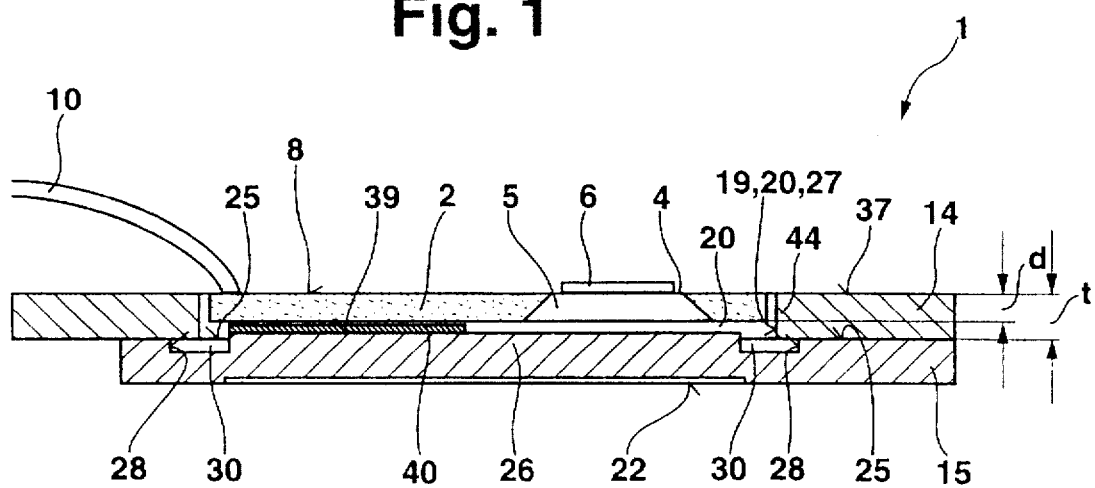
FIG. 1 is a cross-sectional view of a sensor carrier with a sensor element in accordance with a first exemplary embodiment of the device according to the invention.

The sensor carrier 1, shown in cross section in FIG. 1, is intended for a platelike sensor element 2. The sensor carrier 1 and sensor element 2 are parts of a flow rate meter, not shown in further detail, for measuring the mass of a flowing medium and in particular the mass of air aspirated by an internal combustion engine. The sensor carrier 1 serves to receive and retain the sensor element 2, which has a diaphragmlike sensor region embodied for instance in the form of a dielectric diaphragm 4. The sensor element 2 or diaphragm 4 may be manufactured by etching out a semiconductor body, such as a silicon wafer, using so-called micromechanics. To measure the mass of the flowing medium, at least one temperature-dependent measuring resistor 6 and for instance at least one heating resistor are provided on the diaphragm, which by way of example are likewise made by being etched out. Outside the diaphragm 4, a reference resistor may be provided on the sensor element 2. The measuring resistor 6, heating resistor and reference resistor are electrically connected to an electronic closed-loop control circuit, not shown in further detail, for instance by means of conductor tracks and by means of wires 10 applied to bond pads. The electronic control circuit serves in a known manner to supply current or voltage to the resistors on the sensor element 2 and to evaluate the electrical signals output by the resistors. By way of example, the control circuit may be accommodated inside a housing or outside the housing of the device. The dielectric diaphragm 4 comprises silicon nitride and/or silicon oxide, for example. The heating resistor is embodied as an electrical resistance layer, which heats up when current flows through it and heats the diaphragm 4 to a temperature that is above the temperature of the medium to be measured. The heating resistor may for instance comprise a method or suitably doped silicon. The measuring resistor and the reference resistor may also for instance comprise an electrical resistance layer, whose conductivity varies as a function of the temperature. Suitable materials for these resistance layers are metals or suitably doped silicon.

The sensor element 2 has a platelike, for instance rectangular form and is oriented with its largest surface 8 approximately parallel to the medium flowing into the plane of the drawing in FIG. 1; a short side of the sensor element 2, which for instance is rectangular, extends in the flow direction. The flow direction of the medium is indicated by corresponding arrows 9 in FIGS. 2 and 4, where it flows from top to bottom. By means of the heating resistor applied to the diaphragm 4, the diaphragm 4 is heated to a temperature that is higher than the temperature of the medium flowing past it. The quantity of heat dissipated from the heating resistor by the medium flowing past it, substantially by convection, depends on the mass of the flowing medium, so that the mass of the flowing medium can be determined by measuring the temperature of the diaphragm 4. Measuring the diaphragm temperature can be done by the measuring resistor 6, or by measuring the resistance of the heating resistor. The reference resistor serves to compensate for the influence of the temperature of the flowing medium; the assumption is that the sensor element 2 outside the diaphragm 4 assumes the temperature of the medium.

The sensor carrier 1 preferably comprises metal and can be made by folding a thin metal strip; stamping, bending, folding, deep-drawing and embossing methods are suitable for this purpose. In the final state of the bent metal strip, approximately two equal-sized elements 14 and 15 rest on one another. In the following description, the unbent element 14 surrounding the sensor element 2 will be called the frame element 14, while the bent element 15 beneath it will be called the retaining element 15. The retaining element 15, in the final event state of approximately 180°, covers an opening 19 of the unbent frame element 14, so that together with the frame element 14 it defines a recess 20 for receiving the sensor element 2. The frame element 14 or recess 20 has a cross section which is approximately that of the for instance rectangular shape of the sensor element 2 and has a depth t which is greater than a thickness d of the sensor element 2 measured crosswise to the flow 9, so that the sensor element 2 can be received entirely in the recess 20. The sensor element 2 is accommodated in the recess 20 with its surface 8 aligned approximately with a surface 37 of the frame element 14. After the folding of the metal strip, the retaining element 15 can be deformed by means of a tool, for instance an embossing tool, that engages an outer face 22 of the retaining element 15, so that a deformed portion of a bottom face 25 of the retaining element 15, defined by the recess 20 of the frame element 14 and taking the form of a for instance rectangular, plateaulike protrusion 26, protrudes somewhat into the recess 20 of the frame element 14. The plateaulike protrusion 26 formed in the region of the opening 19 of the frame element 14 has a somewhat smaller cross section, parallel to the flow direction of the medium, than the cross section of the opening 19 and sensor element 2 mounted on the protrusion 26, so that the region of the diaphragm 4 having the void 5 is covered by the protrusion 26.

According to the invention, a flow channel 30 is provided between the plateaulike protrusion 26 on one side and an encompassing side wall 27, defining the recess 20, of the frame element 14 and an encompassing side wall 28 of the retaining element 15, on the other. A portion 33 of the encompassing side wall 27 of the frame element 14, which is located upstream or downstream, for instance being aligned with the correspondingly upstream or downstream side wall 28 of the retaining element 15, and a portion 29 of the side wall 27 extending parallel to the flow 9 may be embodied with an offset relative to the side wall 28 of the retaining element 15. The flow channel 30 provided between the plateaulike protrusion 26 and the side wall 28 of the retaining element 15 is recessed out of the bottom face 25 of the retaining element 15 in the form of a troughlike indentation, and by way of example it has a rectangular cross section. It is also possible, however, to make the cross section of the troughlike indentation 30 triangular, semicircular, or the like. The troughlike indentation 30 is by way of example formed automatically when the plateaulike protrusion 26 is formed.

Figure 2:
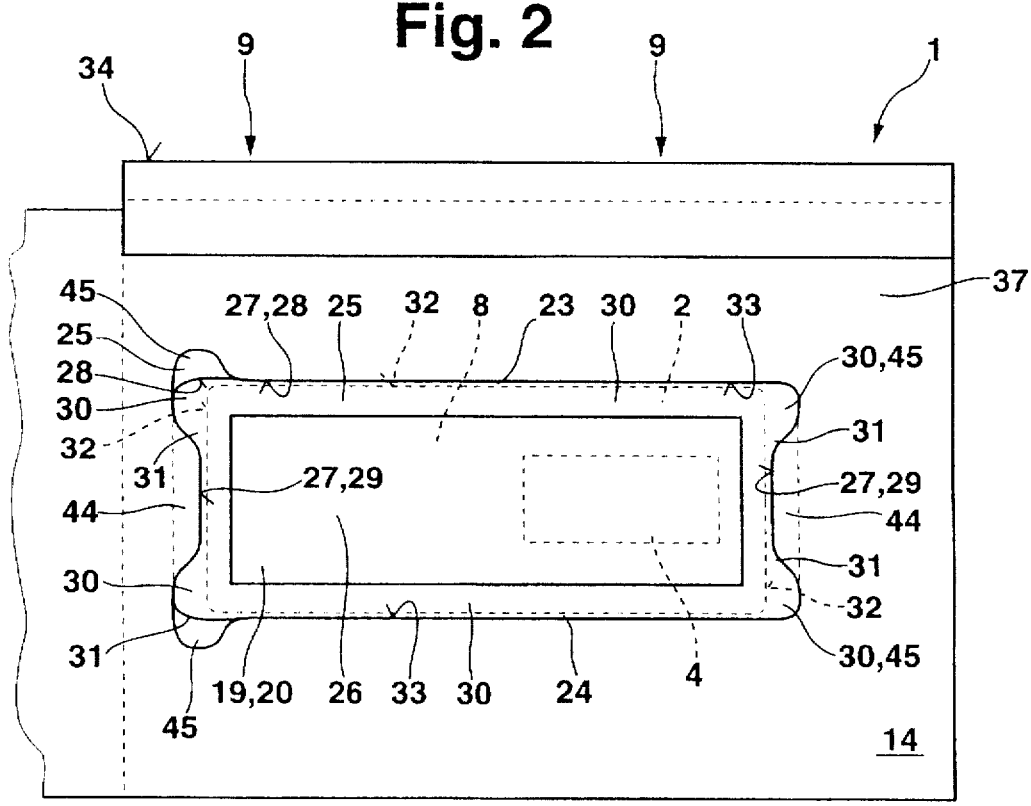
FIG. 2 is a plan view on the sensor carrier of FIG. 1.

As shown in FIG. 2, which is a plan view on the sensor carrier 1, the flow channel 30 extends all the way around the plateaulike protrusion 26. The flow channel 30, indicated by a dot-dashed line in FIG. 2, extends along the circumference of the sensor element 2, so that the flow channel 30 extends in framelike fashion beneath the sensor element 2, along its side faces 32 toward the retaining element 15. The sensor element 2 has a somewhat smaller cross section than the recess 20, so that an extremely small gap 23 on the upstream-pointing side and an extremely small gap on the downstream-pointing side, which merge into the flow channel 30, are produced between the encompassing side faces 32 of the sensor element 2 and the side wall 27 of the frame element 14 along the circumference of the sensor element 2. In particular, the gap 23 facing into the flow 9 has a width that is on the order of magnitude of a few micrometers. Because the gap width is so slight, particularly of the gap 23 facing into the flow 9, a strong throttling action on the flow exists, so that only an extremely slight portion of the medium can flow into the gap 23. By far the greatest portion of the medium therefore continues to flow, unimpeded by the gap 23, from a leading edge 34 across the surface 37 of the frame element 14 and across the surface 8 of the sensor element 2. The medium flowing into the flow channel 30 in an extremely small quantity by way of the gap 23 is carried, according to the invention, around the region 4 of the sensor element 2 by means of the flow channel 30, which in comparison with the gap 23 has a large cross section; after that, the medium leaves the recess 20 again by way of the rear gap 24 that faces away from the flow 9. The diversion of the flow along the edge of the sensor element 2 according to the invention prevents the medium, flowing in via the gap 23, from being at an angle to reach a void 5, located below the diaphragm 4 of the sensor element 2 and defined by the diaphragm 4 and the plateaulike protrusion 26. A flow underneath the diaphragm 4 or in the void 5 would otherwise cause an undesired dissipation of heat from the diaphragm 4 that would not depend on the mass of the medium flowing outside and would therefore disadvantageously affect the outcome of measurement. With the aid of the flow channel 30, so-called tight gluing of the sensor element 2 in the recess 20, in which the sensor element 2 is glued with a large portion of its surface into the recess 20, so as to prevent a flow beneath the diaphragm by means of the flat gluing, can be dispensed with. It is therefore sufficient for the sensor element 2 to be glued to the plateaulike protrusion 26 by means of an adhesive 40 only on one side, in an adhesive region 39 that does not extend as far as the diaphragm 4 and that is shown on the left in FIGS. 1–4, so that the remainder of the sensor element 2 encompassing the diaphragm 4, spaced slightly apart from the plateaulike protrusion 26, is retained virtually self-supporting in the recess 20. The adhesive 40 is applied in the gluing operation to the protrusion 26 in such a way that if at all possible no adhesive 40 enters the flow channel 30. A shown in FIG. 2, the frame element 14, for positional centering of the sensor element 2 in the recess 20, may have regions 44 on its short side walls 27 extending parallel to the flow 9, which regions are embodied such that the portion 31 of the flow channel 30 extending parallel to the flow 9 is at least partially covered by the regions 44, extending parallel to the flow 9, of the side walls 27 of the frame element 14. Corner regions 45 of the side walls 27 of the frame element 14 may have a rounded shape, to enable easy manufacture of the side walls 27 of the frame element 14. By way of example, the corner regions 45 of the recess 20 that are shown on the left in FIG. 2 may also be rounded in such a way that they partly extend beyond the region of the flow channel 30, so that part of the flow channel 30 and the bottom face 25 of the retaining element 15 is not covered by the frame element 14.

FIG. 3 shows a second exemplary embodiment of the sensor carrier 1, in which all the elements that are the same or function the same carry the same reference numerals as in the first exemplary embodiment shown in FIGS. 1 and 2. As shown in FIG. 3, which is a cross-sectional view of the sensor carrier 1 and sensor element 2, it is possible instead of the single plateaulike protrusion 26 for two plateaulike protrusions 41, 42 to be provided, which will hereinafter be called the first protrusion 41 and second protrusion 42. The protrusions 41, 42 protrude somewhat from the bottom face 25 of the retaining element 15; by way of example, the second protrusion 42 shown on the right in FIGS. 3 and 4 has a rectangular shape and has a surface that is larger than the surface of the diaphragm 4, so that in the built-in state of the sensor element 2 it completely covers the diaphragm 4 and the void 5 located beneath the diaphragm 4. According to the invention, the flow channel 30 extends around both protrusions 41, 42 and is recessed from the bottom face 25 of the retaining element 15 in the form of a troughlike indentation 30. The flow channel 30 extends around the two protrusions 41, 42 in such a way that in the plan view of FIG. 4 the resultant course of the flow channel 30 is a horizontal figure eight. The flow channel 30, as in the first exemplary embodiment, is intended for diverting the medium, flowing in in extremely small amounts via the upstream gap 23, around the region of the diaphragm 4. Since the flow channel 30 also extends between the protrusions 41, 42, some of the medium can also flow between the protrusions 41, 42 in the flow channel 30, leaving it again by way of the downstream gap 24. Dividing the protrusion 26 shown in FIGS. 1 and 2 into two spaced-apart protrusions 41 and 42 has the advantage that medium flowing into the flow channel 30 via the upstream gap 23 needs only a relatively short path between the protrusions 41, 42 and around the diaphragm 4 to be able to leave the flow channel 30 again from the downstream gap 24; this further reduces the risk of a flow beneath the diaphragm 4 or void 5.

As shown in FIG. 3, the frame element 14 may have a side wall 27, which at least in individual regions 44, 46 is somewhat offset from the side wall 28 of the retaining element 15 and protrudes closer to the circumference of the sensor element 2, so that it can cover about half of the flow channel 30, for instance. The regions 44 in particular serve to center the sensor element 2 in the recess 20 and are located outside the corner regions 45 of the recess 20. Only at the first protrusion 41 shown on the left in FIGS. 3 and 4 is the sensor element 2 glued by means of an adhesive 40, so that the remaining region of the sensor element 2 with the diaphragm 4 is retained in self-supporting fashion, or in other words spaced only slightly apart from the second protrusion 42, in the recess 20. In the gluing operation, assurance must be provided so that if at all possible no adhesive 40 will get into the flow channel 30.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A device for measuring the mass of a flowing medium, aspirated by internal combustion engines, which comprises a sensor carrier, a platelike sensor element which is accommodated in a recess (20) of said sensor carrier, said sensor element includes a sensor region (4) that has at least one measuring resistor (6) exposed to the flowing medium in order to measure a mass of the flowing medium, the sensor element is accommodated essentially flush in the recess and is retained in the recess by means of being glued along a portion of a bottom surface to a bottom face in the recess, the bottom face (25) of the recess (20) of the sensor carrier (1) has a troughlike indentation (30) in a plane below said sensor element (2) parallel with the bottom surface, which extends at least partially along a circumference of the sensor element (2) outside the sensor region (4) that includes the at least one measuring resistor (6).

2. A device in accordance with claim 1, in which the sensor carrier (1) comprises two elements, that is, a frame element (14) and a retaining element (15), with one element disposed above the other, an opening (19) being provided in the frame element (14) forms the recess (20), at least one plateaulike protrusion (26) is provided in the retaining element (15), the troughlike indentation (30) extends around said at least one plateaulike protrusion so that the sensor region (4) of the sensor element (2) that includes the measuring resistor (6) is at least partially surrounded by the indentation (30).

3. A device in accordance with claim 2, in which only a portion of a bottom surface of the sensor element (2) is glued to the at least one protrusion (26), so that the sensor region (4) having the measuring resistor (6) is accommodated in the recess (20) in a manner free of an adhesive bond and spaced apart from the at least one protrusion (26).

4. A device in accordance with claim 2, in which the upper face (25) of the retaining element (15) has two plateaulike protrusions (41, 42), and the troughlike indentation (30) extends around a combination of said two plateaulike protrusions (41, 42).

5. A device in accordance with claim 4, in which one of the protrusions (42) is provided in the region of the sensor region (4) of the sensor element (2) having the measuring resistor (6) and has a cross section which is greater than that of the sensor region (4) of the sensor element (2) including the measuring resistor (6).

6. A device in accordance with claim 1, in which the troughlike indentation (30) provided in the bottom face (25) of said recess has a polygonal, in particular triangular or rectangular, or circular cross section.

7. A device in accordance with claim 1, in which the sensor element (2) is accommodated in the recess (20) in such a way that at least on a side facing into the flow only an extremely slight gap (23, 24) is present between the sensor element (2) and one wall (27) of the recess (20).

8. A device in accordance with claim 7, in which the gap (23, 24) has a size on the order of magnitude of a few micrometers.

9. A device in accordance with claim 1, in which the sensor region (4) having the at least one measuring resistor (6) is embodied in diaphragmlike fashion.

* * * * *